May 5, 1942.　　　A. C. TEN CATE　　　2,281,640
PRESELECTOR
Filed Jan. 27, 1938　　2 Sheets-Sheet 1
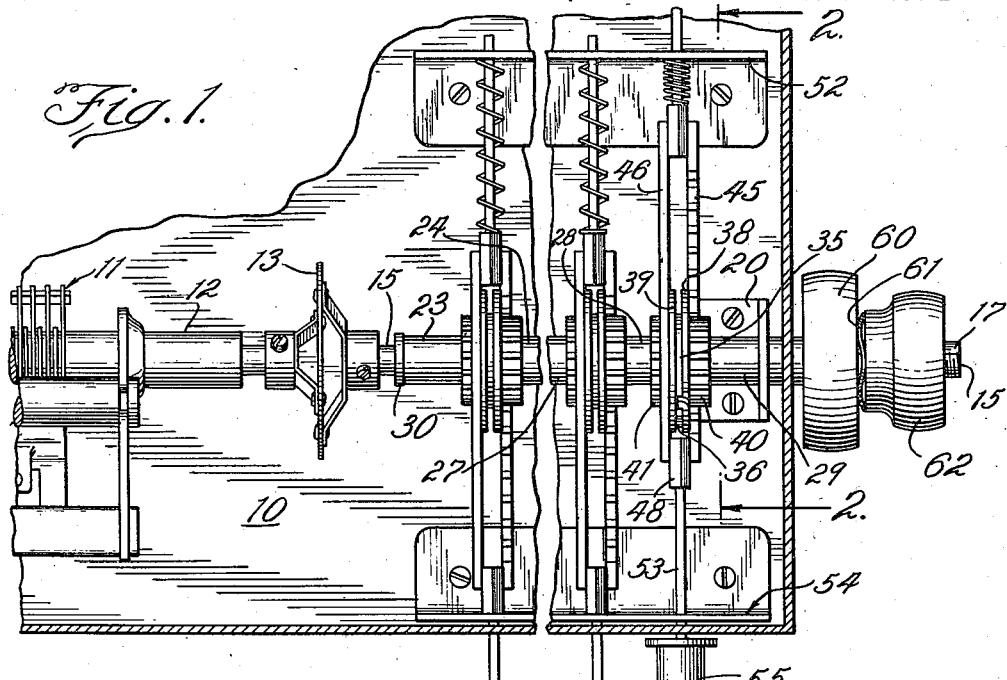
Fig. 1.
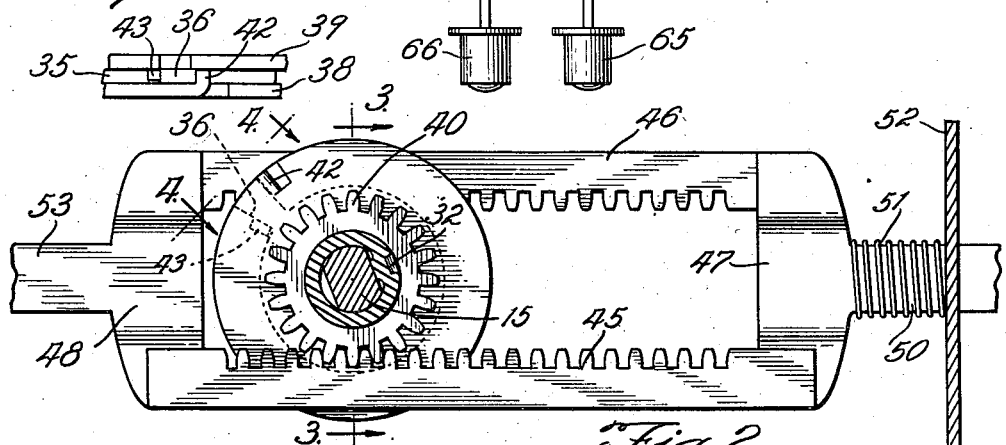
Fig. 2.
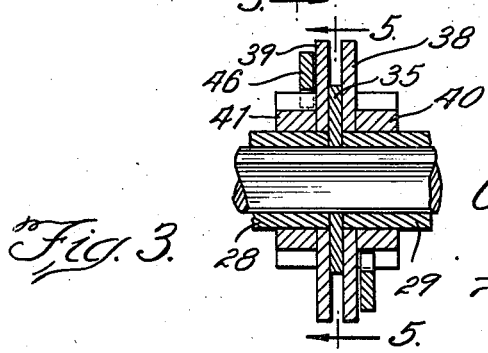
Fig. 4.
Fig. 3.
Inventor:
Arthur C. Ten Cate
By Robert L. Kahn
Atty.

May 5, 1942.  A. C. TEN CATE  2,281,640
PRESELECTOR
Filed Jan. 27, 1938  2 Sheets-Sheet 2
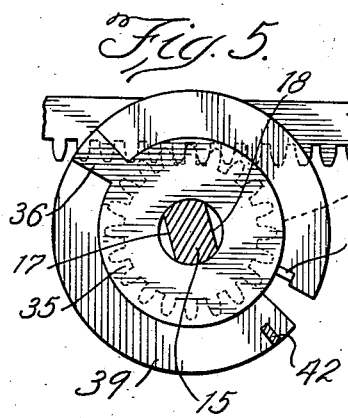
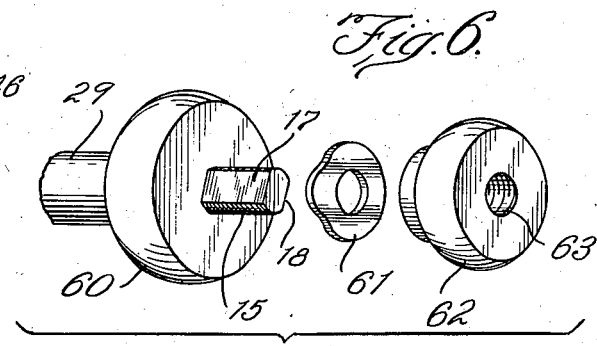
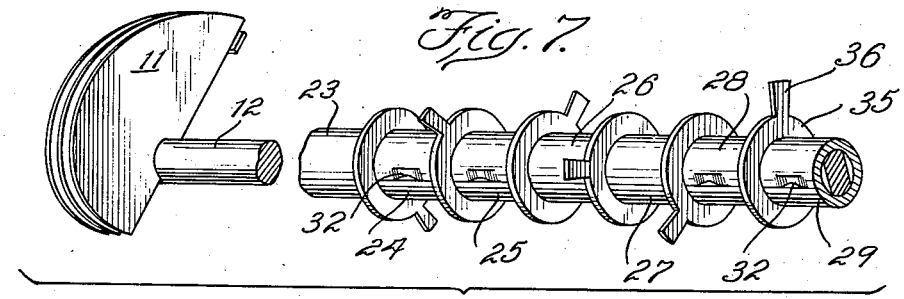
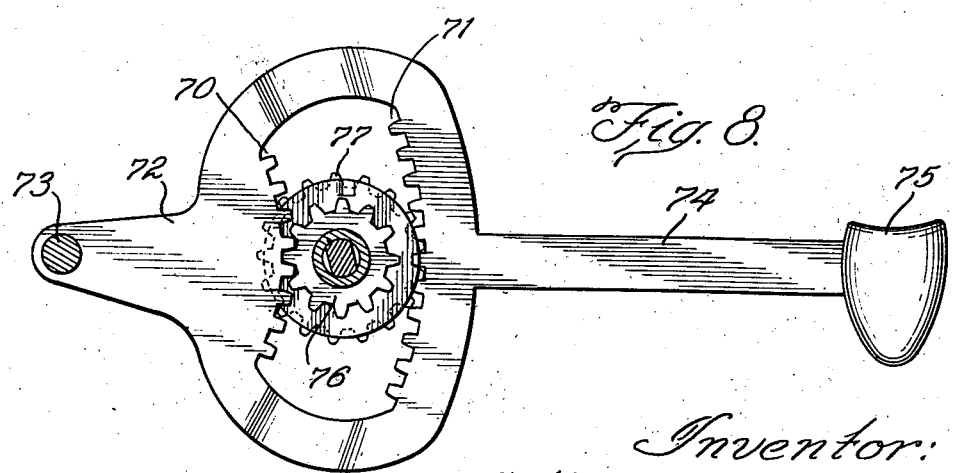
Inventor:
Arthur C. Ten Cate.
By:- Robert L. Kahn
Atty.

Patented May 5, 1942

2,281,640

UNITED STATES PATENT OFFICE 2,281,640

PRESELECTOR

Arthur C. Ten Cate, Chicago, Ill., assignor to Oak Manufacturing Company, Chicago, Ill., a corporation of Illinois Application January 27, 1938, Serial No. 187,176

10 Claims. (Cl. 74—10)

This invention relates to a preselecting means, particularly for use in connection with the tuning of radio receivers. It is desirable to provide means in a radio receiver whereby the tuning element thereof, usually the gang condenser, may be turned directly to a predetermined point for the reception of a predetermined station. An object of this invention is to device a simple and efficient means for accomplishing this. A further object is to provide a preselector wherein a minimum of friction is present between moving parts.

Referring to the drawings:

Figure 1 shows a plan view of the mechanism.
Figure 2 is a section on line 2—2 of Figure 1.
Figure 3 is a section on line 3—3 of Figure 2.
Figure 4 is a detail on line 4—4 of Figure 2.
Figure 5 is a section on line 5—5 of Figure 3.
Figure 6 is an exploded view showing the control knobs.
Figure 7 is a detail of the shaft and the sleeves and shaft washers.
Figure 8 shows a modified form.

In Figure 1 a base 10 may have a gang condenser 11 mounted thereon whose shaft 12 is to be turned to predetermined positions. Condenser shaft 12 is coupled by any suitable universal joint 13 to the preselecting shaft 15. Shaft 15 as clearly shown in Figure 6, is mutilated to provide two flat portions 17 and 18 diametrically opposed to each other. This shaft and surrounding sleeve may be supported in any suitable bearing 20.

Disposed over shaft 15 are a plurality of sleeves 23 to 29 inclusive (see Figure 7). Sleeve 23 is preferably provided with a shoulder 30 (Fig. 1) and is firmly disposed on shaft 15 so that, in effect, it forms a part thereof. The remaining sleeves 24 to 29 inclusive are all similar and are each provided with an indentation 32 adapted to ride on one of the flat faces 17 or 18 of shaft 15 so that the sleeves are rotatably coupled to the shaft. Preferably the pressure of indentation 32 on the shaft flat face is sufficient to provide a moderate amount of friction, the degree of which will be apparent later.

Since each preselector unit is the same, only one will be described in detail. Between adjacent sleeves, such as for example 28 and 29, a shaft washer 35 is disposed carrying a finger 36 extending outwardly therefrom to form a coupling means. As is clearly apparent in Figure 3, shaft washer 35 is disposed immediately around shaft 15 and separates the neighboring sleeves 28 and 29 from each other. On each side of washer 35 and disposed around the respective sleeves are sleeve washers 38 and 39 rigidly joined to gears 40 and 41 respectively. Thus, sleeve washer 38 and gear 40 form a unit loosely mounted to revolve around sleeve 29. The sleeve washers 38 and 39 are each nicked and bent at one point to provide fingers 42 and 43 extending inwardly. These fingers are suitably dimensioned with respect to finger 36 of shaft washer 35 so that both tend to engage finger 36 of shaft washer 35 when the gears are rotated.

Engaging gear 40 is a rack 45, while a companion rack 46 engages gear 41. As shown in Figure 2, racks 45 and 46 are on opposite sides of the gears and are offset from each other laterally to accommodate the various washers between the gears. These two racks are rigidly joined by end arms 47 and 48 to form a framework. Arm 47 is provided with a finger 50 surrounded by a spring 51 and this finger extends through a suitable slot in a bearing plate 52 supported on the base. Arm 48 of the rack assembly has an extension 53 which extends through a slot in another bearing plate 54 and at the free end of this arm a knob 55 may be disposed. Since the washers of each preselector unit comprising washers 35, 38 and 39 are between the opposed racks 45 and 46, sleeve washers 38 and 39 being preferably larger than their gears, it is clear that each washer assembly together with its gears will be maintained intact between the opposed racks in spite of the gears being loose on the sleeves.

When knob 55 is pusher in as shown in Figure 1, the racks are moved forward and the gears are rotated in opposite directions at equal speeds, these gears and racks being identical with regard to teeth. The corresponding sleeve washers 38 and 39 will be rotated in opposite directions with the gears. Thus, the fingers 42 and 43 will be turned in opposite directions and whichever one engages the finger 36 will rotate this finger until the oppositely travelling finger is reached. In order to avoid confusion, finger 36 will be referred to as the shaft finger, since ordinarily it is rotatively coupled to shaft 15. When oppositely moving sleeve fingers 42 and 43 both engage shaft finger 36, no further movement of the racks will be possible ordinarily. Shaft finger 36 is adjusted so that this final position is reached when button 55 is pushed in to its limiting position.

In order to adjust shaft finger 36 with reference to the shaft proper, the means shown in Figure 6 is provided. As shown here, a knob 60 having a squared aperture is mounted on shaft 15 so as to turn therewith. By turning knob 60, shaft 15 is always turned and thus the gang condenser may be adjusted manually. Disposed over shaft 15 on the outer face of knob 60 is a spring washer 61. A tightening knob 62 suitably threaded at 63 is adapted to be screwed over a threaded portion of shaft 15 and tends to tighten all the sleeves against each other. Since the end sleeve 23 is rigid on the shaft, it is clear that the various washers 35 between sleeves will be clamped tightly. By loosening knob 62, the pressure of the sleeves on the opposite sides of washers 35 is reduced so that these washers may turn on the shaft.

In order to adjust the preselecting means, knob 62 is loosened. Push button 55 is pressed in all the way as shown in Figure 1 and while in this position the gang condenser is adjusted by knob 60 to the desired position. The various sleeves are so designed that the gears 40 and 41 are freely rotatable on the sleeves while the sleeves move rather hard on shaft 15 lengthwise only. Hence shaft washer 35 is permitted to turn in response to the various fingers. By this provision, when push button 55 is released and the racks are driven back by means of coil spring 50, gears 40 and 41 will turn freely, but being disengaged from shaft finger 36 will not effect its adjustment since washer 35 should not turn too easily. Hence, the free return movement of the preselector will leave shaft finger 36 in the preselected position with reference to shaft 15.

Similarly, other push buttons 65 and 66 may be successively pressed in to the extreme position and the gang condenser adjusted by means of manual knob 60 to the desired positions. When all of the preselecting units have thus been adjusted, tightening knob 62 is turned and the entire collection of sleeves is tightly compressed to rigidly retain the various shaft fingers in their adjusted positions.

As shown in Figure 7, these fingers are disposed in various relationships to the shaft. Upon pressing the button corresponding to the finger, the racks are pushed in to their farthest position and the shaft finger is always brought to the position shown in Figure 2.

Referring to Figure 8, a modified form is shown wherein a pair of segmental gears 70 and 71 are provided to form a frame offset in the same manner. This frame 72 is pivoted at 73 and is provided with a handle 74 and a push button 75.

In this case the gears 76 and 77 on opposite sides of the washer assembly must be in the same proportion as the ratio of the diameters of segmental gears 70 and 71. Inasmuch as both gears 76 and 77 must be moved in opposite directions at equal speeds during the movement of the entire assembly on its pivot 73, the relationship of the two segmental gears is obvious.

It is understood, of course, that instead of fingers on the washers and gears, that other coupling means may be used. Also, instead of gears, other rotary means may be used. Whenever these terms are used it is understood that all mechanical equivalents are included.

What is claimed is:

1. A preselector comprising a shaft adapted to be turned to a predetermined position, coupling means rotatably adjustable on said shaft, said coupling means including means adapted to be engaged for turning the coupling means, a gear freely rotatable on said shaft on each side of said coupling means, means actuated by each gear for engaging said gear and said coupling means at predetermined angular positions determined by the relative rotary positions of said coupling means and each gear, and a pair of racks operating as a unit for simultaneously rotating said gears in opposite directions until gears urge the coupling means in opposite directions with equal force, said opposing forces on said coupling means being the sole means to establish a preselected shaft position and stop the travel of said freely rotatable means.

2. A preselector comprising a shaft adapted to be turned to a preselected position, coupling means rotatively adjustable on said shaft, said coupling means including means adapted to be engaged for turning the coupling means, a sleeve on each side of said coupling means rotatively locked to said shaft but movable longitudinally thereof, freely rotatable means on each sleeve on each side of said coupling means, means actuated by said freely rotatable means for engaging said coupling means at predetermined angular positions determined by the relative rotary positions of said coupling means and each of said freely rotatable means, means for simultaneously rotating said freely rotatable means in opposite directions until each freely rotatable means urges said coupling means in opposite directions with equal force, said opposing forces on said coupling means being the sole means to establish a preselected shaft position and stop the travel of said freely rotatable means.

3. The structure of claim 2 wherein said coupling means includes a washer freely rotatable around said shaft and disposed between the opposite sleeves and wherein means are provided for tightly pressing said sleeves on opposite sides of said coupling washer to retain said washer in a fixed rotary position.

4. A preselecting means comprising a shaft to be turned to a preselected position, a finger rotatively coupled to said shaft and extending outwardly therefrom, a pinion loosely mounted on said shaft on each side of said finger, means located on one point of each pinion for engaging said finger upon rotation of said pinion to the engaging position, a pair of racks rigidly coupled to each other and engaging said pinions in opposed relation whereby upon movement of the racks said pinions are urged in opposite directions, and manual means for moving said racks.

5. A preselecting device comprising a shaft adapted to be turned to a preselected position, a finger mounted on said shaft and extending outwardly therefrom, means for coupling said finger to said shaft in predetermined relation, a pinion loosely mounted on the shaft on each side of said finger, means on each pinion at one spot thereof for engaging said finger upon the rotation of said pinion to a predetermined position, a movable frame having a pair of racks, each rack engaging one pinion with said racks tending to move said pinions in opposite directions upon movement of said frame, and manual means for moving said frame to rotate said pinions whereby said finger is moved to a position where both pinions engage said finger on opposite sides thereof.

6. A preselecting device comprising a shaft adapted to be moved to a plurality of preselected positions, a plurality of preselector units, each unit comprising a finger mounted on said shaft and extending outwardly therefrom, means for coupling said finger and said shaft to move together, a pair of pinions one on each side of said finger loosely mounted on said shaft, each pinion having means located at one point thereof for engaging said finger upon rotation of said pinion to a predetermined position, a pair of racks rigidly joined together and engaging said pinions, each rack tending to turn its pinion in a direction opposite to the other rack and pinion, manual means for moving said racks to an end position, and means for disengaging each finger of each unit from said shaft so that upon movement of each rack unit the corresponding finger will slip with respect to the shaft but upon manual movement of the shaft said finger will move therewith to permit adjustment of said various units to operate on said shaft in a predetermined manner.

7. In a device of the character described, a shaft, a plurality of sleeves disposed on said shaft, a washer disposed between adjacent sleeves, each washer having an outwardly extending projection, a gear loosely mounted on each side of each washer, each gear having a projection extending in the path of movement of said washer projection, a pair of manually movable racks rigidly coupled, each rack cooperating with each gear on opposite sides of a washer, said racks being adapted to rotate said gears in opposite directions upon movement of said rack, and means for tightening said sleeves to hold said washers firmly.

8. In a device of the character described, a shaft, a plurality of sleeves disposed over said shaft, said sleeves being rotatively coupled to said shaft but movable lengthwise thereof, a washer between adjacent sleeves, each washer having a finger extending outwardly therefrom, an operating unit for each washer comprising a gear on opposite sides of each washer, each gear having a projection adapted to engage the washer finger with said gears freely rotatable on the sleeves, a manually movable rack unit comprising a pair of racks rigidly coupled together, each rack coupled to a gear and both racks of one unit adapted to turn their gears in opposite directions upon movement of said rack, means for biasing each rack unit in one end position, and means for maintaining said sleeves tightly against each other to clamp said washers in fixed predetermined relation to said shaft.

9. In a device of the character described, a shaft having a plurality of sleeves disposed thereover, said sleeves being longitudinally movable along said shaft but rotatably coupled thereto, a washer freely rotatable about the shaft and disposed between adjacent sleeves, each washer having an outwardly extending finger, additional washers disposed on said sleeves and rotatable with respect thereto, each of the finger washers having an additional washer on each side thereof to form a unit therewith, said additional washers having fingers extending toward each other and adapted to engage the finger of the first named washer, a gear rigidly coupled to each additional washer, a rack cooperating with each gear, the two racks for each unit being rigidly coupled together, and adapted to rotate the gears of each unit in opposite directions, spring means for biasing the coupled racks in one end position, manual means to move said racks in the opposite end position and against the bias thereof, and means for tightening said sleeves to rigidly clamp the finger washers in predetermined relation to the shaft.

10. The structure of claim 9 wherein said racks are curved to form segmental gears.

ARTHUR C. TEN CATE.